(12) United States Patent
Miyawaki et al.

(10) Patent No.: US 12,303,996 B2
(45) Date of Patent: May 20, 2025

(54) WELDED STRUCTURE AND FRICTION STIR WELDING DEVICE

(71) Applicant: HONDA MOTOR CO., LTD., Tokyo (JP)

(72) Inventors: Akiyoshi Miyawaki, Saitama (JP); Mitsuru Sayama, Saitama (JP); Taichi Kurihara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 541 days.

(21) Appl. No.: 17/676,471

(22) Filed: Feb. 21, 2022

(65) Prior Publication Data
US 2022/0314362 A1 Oct. 6, 2022

(30) Foreign Application Priority Data
Mar. 31, 2021 (JP) .................................. 2021-061059

(51) Int. Cl.
*B23K 20/00* (2006.01)
*B23K 20/12* (2006.01)
*F16B 5/08* (2006.01)

(52) U.S. Cl.
CPC ........ *B23K 20/126* (2013.01); *B23K 20/1225* (2013.01); *F16B 5/08* (2013.01)

(58) Field of Classification Search
CPC .. B23K 20/1255; B23K 20/126; B23K 20/26; B23K 20/1225; B23K 20/123; B23K 20/1245; B23K 20/125
See application file for complete search history.

(56) References Cited

U.S. PATENT DOCUMENTS

| | | | | |
|---|---|---|---|---|
| 7,581,665 B2 * | 9/2009 | Burton | ............... | B23K 20/1255 228/2.1 |
| 7,681,773 B2 * | 3/2010 | Burton | ................. | B23K 20/126 228/2.1 |
| 8,052,028 B2 * | 11/2011 | Hall | .................... | B23K 20/1265 228/2.1 |

(Continued)

FOREIGN PATENT DOCUMENTS

| | | |
|---|---|---|
| CN | 104718046 A | 6/2015 |
| CN | 106001905 A | 10/2016 |

(Continued)

OTHER PUBLICATIONS

China Office Action for patent application CN 2022101620523 dated Apr. 26, 2023; 11 pp.

(Continued)

*Primary Examiner* — Erin B Saad
(74) *Attorney, Agent, or Firm* — Armstrong Teasdale LLP

(57) ABSTRACT

A welded structure includes a first workpiece (11), a second workpiece (12), a bonded part (28) formed between the first workpiece and the second workpiece by plastically displaced materials of the first workpiece and the second workpiece, and a hooking portion (29) having a base end embedded in the second workpiece, and a tip end extending into the first workpiece, the hooking portion extending radially outwardly and upward along an outer periphery of the bonded part. A device for forming such a structure includes a clamp ring (18) which is provided with a central recess (25) in a part of a contact surface (24) thereof located around a through hole (19).

4 Claims, 13 Drawing Sheets

(56) References Cited

U.S. PATENT DOCUMENTS

| | | | |
|---|---|---|---|
| 9,676,055 B2 | 6/2017 | Fukuda | |
| 9,956,644 B2* | 5/2018 | Foerg | B23K 20/1225 |
| 10,016,839 B1* | 7/2018 | Iqbal | C22C 1/1084 |
| 10,661,379 B1* | 5/2020 | Larsson | B23K 37/08 |
| 11,660,700 B2* | 5/2023 | Norman | B23K 20/122 |
| | | | 228/114 |
| 11,679,446 B2* | 6/2023 | Miyawaki | B23K 20/1255 |
| | | | 228/2.1 |
| 11,938,559 B2* | 3/2024 | Ouchi | B23K 20/126 |
| 2003/0209588 A1 | 11/2003 | Colligan | |
| 2006/0043151 A1* | 3/2006 | Stol | B23K 20/1255 |
| | | | 228/2.1 |
| 2007/0152015 A1* | 7/2007 | Burton | B23K 20/1265 |
| | | | 228/2.1 |
| 2009/0236045 A1* | 9/2009 | Burton | B23K 20/1255 |
| | | | 228/2.1 |
| 2010/0038832 A1* | 2/2010 | Rosal | B23K 20/1255 |
| | | | 228/2.1 |
| 2015/0102087 A1* | 4/2015 | Foerg | B23K 20/1255 |
| | | | 228/2.1 |
| 2015/0174697 A1 | 6/2015 | Fukuda | |
| 2016/0354860 A1 | 12/2016 | Boettcher et al. | |
| 2017/0182587 A1 | 6/2017 | Tokoro et al. | |
| 2019/0344380 A1* | 11/2019 | Miles | B23K 20/2336 |
| 2021/0402508 A1* | 12/2021 | Miyawaki | B23K 20/1255 |
| 2023/0311241 A1* | 10/2023 | Miyawaki | B23K 20/1255 |
| | | | 228/112.1 |
| 2024/0261889 A1* | 8/2024 | Miyawaki | B23K 20/1255 |

FOREIGN PATENT DOCUMENTS

| | | |
|---|---|---|
| CN | 106925881 A | 7/2017 |
| CN | 107442927 A | 12/2017 |
| CN | 207642479 U | 7/2018 |
| JP | 2006061921 A | 3/2006 |
| JP | 2012192437 A | 10/2012 |
| JP | 2013086175 A | 5/2013 |
| JP | 2014050859 A | 3/2014 |
| KR | 20070061937 A | 6/2007 |
| WO | 2020032142 A1 | 2/2020 |

OTHER PUBLICATIONS

Notice of Reasons for Refusal for Japanese Patent Application No. 2021-061059 dated Aug. 20, 2024; 6 pp.

* cited by examiner

WELDED STRUCTURE AND FRICTION STIR WELDING DEVICE

TECHNICAL FIELD

The present invention relates to a welded structure in which a plurality of workpieces are joined to each other by friction stir welding, and a friction stir welding device.

BACKGROUND ART

Friction stir welding is known in the art as a method in which a rotating tool is pressed against a pair of mutually overlapping members so that the material of the members adjacent to the rotating tool is plastically stirred and displaced by frictional heat, and a bonded part is created between the members. It is also possible to join three or more members at the same time. This method can be practiced either as a spot welding for joining the members at a single spot, or a line welding for joining the members along a line. In the former case, while spot welding is being performed at each spot, the rotating tool is kept stationary at the single spot. In the latter case, the rotating tool is moved along the line relative to the members to be joined.

In friction stir welding, the materials of the two members are plastically displaced and stirred, and the two members are joined to each other via a bonded part (stirred part) where the plastically stirred materials of the two members are bonded to each other.

However, as discussed in JP2013-086175A, the material of one of the members is pulled along the outer periphery of the stirred part, and this is referred to as "hooking". FIG. 13 shows a lower member 2 and an upper member 1 that are friction stir welded to each other. A bonded part 3 is created in a region where the rotating probe has stirred the materials of the two members 1 and 2, but a part of the material of the lower member 2 extends along the outer periphery of the bonded part 3 to form a hooking portion 5. The hooking portion 5 is known to reduce the bonding strength of the bonded part 3.

To address this problem, JP2013-086175A proposes the use of a frustoconical probe having a prescribed geometrical shape. However, this technology requires the probe to have a special shape, and this shape has to be adjusted depending on the thickness of the upper member to be joined. Therefore, this approach requires added effort and expenses to achieve the desired goal.

SUMMARY OF THE INVENTION

In view of such a problem of the prior art, a primary object of the present invention is to provide a welded structure in which a plurality of workpieces are joined to each other by friction stir welding in a favorable manner, and a friction stir welding device that can produce such a welded structure in a simple and economical manner.

To achieve such an object, the present invention provides a welded structure including a first workpiece (11), a second workpiece (2) on which the first workpiece is placed in an overlying relationship, a bonded part (28) formed between the first workpiece and the second workpiece by plastically displaced materials of the first workpiece and the second workpiece, and a hooking portion (29) having a base end embedded in the second workpiece, and a tip end extending into the first workpiece, the hooking portion extending radially outwardly and away from the second workpiece along an outer periphery of the bonded part, the tip end projecting radially more outward than the base end. Thus, the outer peripheral surface of the hooking portion leans radially outward. As a result, the hooking portion is enabled to provide a favorable anchoring action that mechanically secures the first workpiece to the second workpiece, and resists peeling of the two workpieces away from each other.

Preferably, the second workpiece is made of a material harder than that of the first workpiece. Thereby, the hooking portion can provide a particularly strong resistance to peeling between the first workpiece and the second workpiece.

Preferably, an outer peripheral surface of the hooking portion is curved so as to present a concave surface on a radially outer side thereof.

Thereby, the anchoring action of the hooking portion can be further improved.

Preferably, the bonded part includes a tubular projection (27) projecting from the first workpiece away from the second workpiece in a peripheral part of the bonded part. The hooking portion projects into the first workpiece, but since the tubular projection is provided near the tip end of the hooking portion, the effective thickness of the first workpiece as measured between the tip end of the hooking portion and the surface of the first workpiece facing away from the second workpiece can be adequately ensured. Thereby, the mechanical strength of the joint between the first workpiece and the second workpiece can be increased.

Preferably, the tip end of the hooking portion terminates in the first workpiece without reaching the tubular projection. Thereby, the effective thickness of the first workpiece is prevented from being reduced so that the hooking portion can provide a particularly strong resistance to peeling between the first workpiece and the second workpiece.

Preferably, an outer periphery of the tubular projection is located radially outward of the tip end of the hooking portion. Thereby, the reinforcing capability of the tubular projection can be maximized.

Preferably, the bonded part is substantially annular in shape and centrally defines a cylindrical recess (20), a bottom end of the cylindrical recess reaching a point beyond an interface between the first workpiece and the second workpiece. The material for the tubular projection can be obtained from the material of the workpieces that is displaced from the cylindrical recess during stir welding process so that the bonded structure can be created without requiring introduction of any extraneous material.

The present invention further provides a stir welding device for joining a plurality of workpieces in a mutually overlying relationship, comprising: a probe (18) having a cylindrical shape and rotatable around a central axis thereof; a clamp ring (15) having a through hole (19) for receiving the probe therein, and a contact surface configured to abut against a surface of one of the workpieces; and a drive unit (D) for rotationally driving the probe and plunging the probe into the workpieces, wherein the clamp ring is provided with a central recess (25) in a part of the contact surface (24) thereof located around the through hole.

The pressure from the probe creates a hooking portion primarily from the material of the other workpiece, and causes the hooking portion to be lodged in the one workpiece. Owing to the anchoring action of the hooking portion, the two workpieces can be firmly joined to each other. Further, the material of the workpieces that is plastically displaced into the central recess forms a tubular projection, and the pressure provided during the creation of the tubular projection causes the hooking portion to bend radially outward so that the anchoring action of the hooking portion can be further improved.

Preferably, the clamp ring is provided with an inner tubular portion (22) projecting axially from a bottom end of the central recess.

The inner tubular portion causes the hooking portion to be bent further radially outward for an improved anchoring action thereof.

Preferably, the inner tubular portion has a free end that projects beyond the contact surface.

This configuration further contributes to the radially outward bending of the hooking portion. Further, even when the thickness of the first workpiece is large, the radially outward displacement of the hooking portion can be started from an early stage of plunging the probe into the first workpiece and the second workpiece.

Alternatively, the inner tubular portion has a free end that projects short of the contact surface.

Thereby, the loading on the probe is reduced when the probe is being plunged into the workpieces.

Preferably, the clamp ring is provided with an annular recess (31) formed in the contact surface thereof around the central recess.

The annular recess prevents dissipation of frictional heat generated by the rotating probe in radially outward direction.

Preferably, the inner tubular portion extends continuously along a circumferential direction thereof, and has a constant radial width. Thereby, the loading on the clamp ring during friction stir welding can be minimized.

Preferably, the inner tubular portion extends continuously along a circumferential direction thereof, and has a varying radial width. Thereby, the flow of the plasticized material can be favorably controlled.

Alternatively, the inner tubular portion has notches or breaks in a free end thereof arranged along the circumferential direction thereof.

Thereby, the flow of the plasticized material can be favorably controlled.

Preferably, the central recess has a flat bottom end, a bottom end which is inclined away from the workpieces toward the central axis, or a bottom end which is inclined toward the workpieces toward the central axis.

By suitably selecting the configuration of the bottom end of the central recess, the material that has become plastically fluid can be guided in a desired manner.

Preferably, the central recess has an outer peripheral wall surface that is inclined away from the central axis toward the workpieces.

Thereby, the material that has become plastically fluid can be guided in a desired manner.

Preferably, the contact surface consists of a plurality of sections that are separated from each other by radial grooves. Thereby, the frictional heat generated by the rotating probe can be favorably guided.

BRIEF DESCRIPTION OF THE DRAWING(S)

DESCRIPTION OF THE PREFERRED EMBODIMENT(S)

Preferred embodiments of the present invention are described in the following with reference to the appended drawings.

Figure 1:
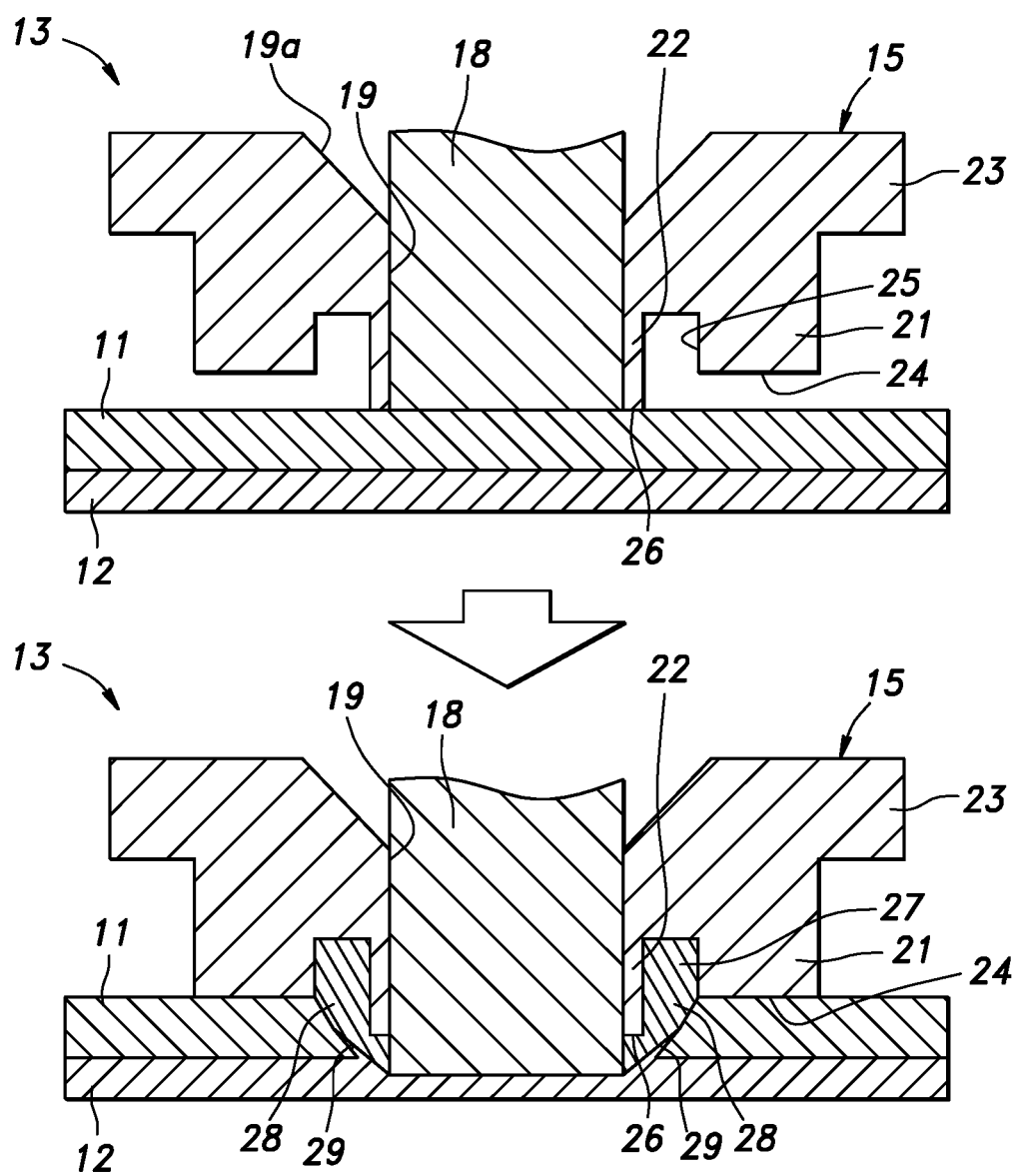
FIG. 1 is a sectional view showing stir welding process performed by a welding device according to a first embodiment of the present invention.
Figure 2:
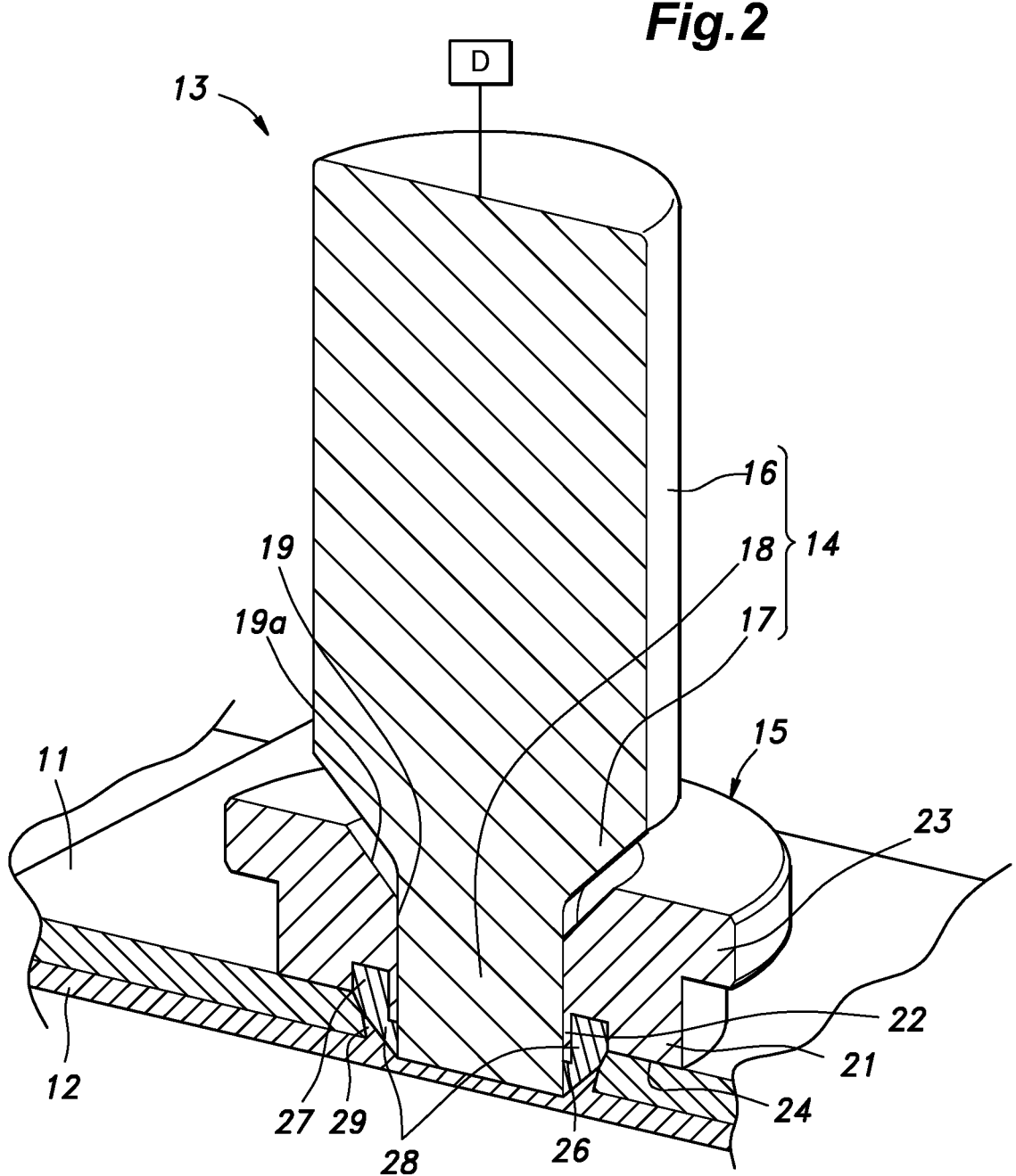
FIG. 2 is a sectional perspective view of the welding device.
Figure 3:
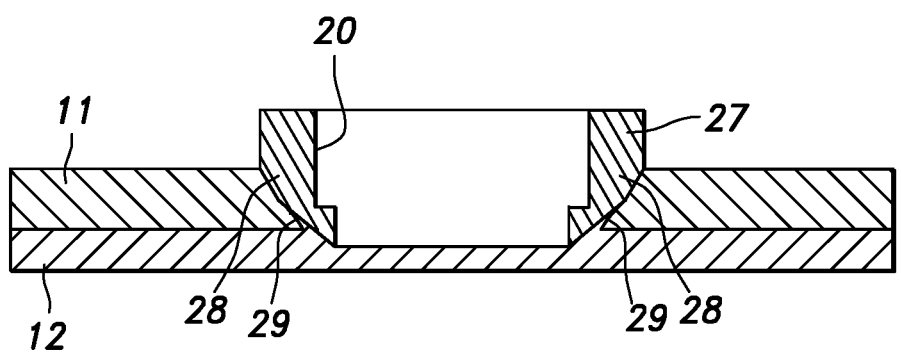
FIG. 3 is a sectional view of two workpieces that are joined to each other by a welded structure according to the present invention.

FIGS. 1 to 3 show a plate-shaped first workpiece 11 and a plate-shaped second workpiece 12 that abut against each other in an overlying relationship at the opposing surfaces (interface) of the two workpieces and bonded to each other by a welded structure according to a preferred embodiment of the present invention. The welded structure in the illustrated embodiment joins the first workpiece 11 to the second workpiece 12 so as to form two layers, but may also be used to join three or more layers of workpieces. The workpieces, at least the parts thereof to be bonded, are typically plate-shaped, but the lowermost layer may not be plate-shaped.

The material of the first workpiece 11 is typically more readily deformable than that of the second workpiece 12, but is not so limited. The possible combinations of the materials for the first workpiece 11 and the second workpiece 12 include, not exclusively, aluminum alloy and iron alloy (steel), low-strength aluminum alloy and high-strength aluminum alloy, mild steel and high-tensile strength steel, aluminum alloy and copper alloy, aluminum alloy and carbon fiber reinforced plastic, aluminum alloy and glass fiber reinforced plastic, magnesium alloy and iron alloy, magnesium alloy and copper alloy, magnesium alloy and carbon fiber reinforced plastic, and magnesium alloy and glass fiber reinforced plastic.

FIGS. 1 and 2 show a friction stir point welding device that includes a tool set 13 consisting of a rotating tool 14 and a clamp ring 15 having an annular shape, and a drive unit D that can rotationally drive and axially plunge the rotating tool 14 as will be discussed hereinafter. In the following disclosure, it is assumed that the central axis of the rotating tool 14 extends in the vertical direction, and the first workpiece 11 and the second workpiece 12 extend horizontally with the second workpiece 12 placed on a worktable (not shown in the drawings) and the first workpiece 11 placed on top of the second workpiece 12. In actual applications, the orientation of the rotating tool 14 is not so limited, but may be freely selected. Further, the central axis of the rotating tool 14 is orthogonal to the surface of the first workpiece 11 in the illustrated embodiment, but may also be at an angle to the normal line of the major plane of the first workpiece 11.

The rotating tool 14 is provided with a rotationally symmetric shape around the central axis thereof, and includes a main body 16 having a substantially cylindrical shape centered around the central axis, a shoulder portion 17 tapering downward so as to present an inverted frusto-conical profile, and a cylindrical probe 18 having a smaller diameter than the main body 16 and extending downward from the lower end of the shoulder portion 17, all in a coaxial relationship. The upper end of the shoulder portion 17 has the same outer diameter as the lower end of the main body 16, and the lower end of the shoulder portion 17 has the same diameter as the upper end of the probe 18. Typically, the main body 16 and the probe 18 each have a constant diameter along the length thereof. The lower end surface of the probe 18 of the illustrated embodiment is flat, but may also be spherical, conical or otherwise convex in shape.

The clamp ring 15 is also rotationally symmetric in shape around the central axis thereof (which coincides with the central axis of the rotating tool 14 when in use), and includes a substantially cylindrical main body 21, and a radial flange 23 extending radially outward from an upper end part thereof. A through hole 19 is passed axially and centrally through the clamp ring 15.

The through hole 19 is formed with a conical portion 19a in an upper part thereof corresponding to the radial flange 23 of the clamp ring 15, but is otherwise a straight hole with a constant diameter. When in use, the probe 18 of the rotating tool 14 is snugly (with a prescribed tolerance) received in the through hole 19, and the upper conical portion 19a of the through hole 19 opposes the shoulder portion 17 of the rotating tool 14 in a substantially conformal fashion. Typically, the upper conical portion 19a and the shoulder portion 17 have a common cone angle.

As shown in FIGS. 1 and 2, the lower end of the clamp ring 15 is centrally provided with an inner tubular portion 22 internally defining a lower part of the through hole 19, and a central recess 25 defined between the outer circumferential surface of the inner tubular portion 22 in an annular shape, and the surrounding part of the clamp ring 15. The bottom end of the clamp ring 15 defines a flat contact surface 24 extending orthogonally to the axis of the clamp ring 15 (to abut against the upper surface of the first workpiece 11 when in use) and surrounding the central recess 25, and the lower end 26 of the inner tubular portion 22 is also flat, but extends somewhat beyond the contact surface 24 of the main body 21 of the clamp ring 15. Thus, the lower end 26 of the inner tubular portion 22, and the contact surface 24 of the clamp ring 15 are annular in shape and concentric to each other.

The main part (lower part) of the through hole 19 is thus passed through the clamp ring 15 and the inner tubular portion 22, and may have a constant diameter, but may also slightly converge downward. The inner diameter of through hole 19, and the outer diameter of the probe 18 are selected in such a manner that the probe 18 can be rotated relative to the clamp ring 15 without creating excessive friction. Preferably, the clearance between the through hole 19 and the probe 18 is about 0.5 mm or less. The vertical distance between the lower end 26 of the inner tubular portion 22 and the lower end (contact surface 24) of the clamp ring 15 is smaller than the thickness of the first workpiece 11.

The mode of operation of this friction stir welding device in joining the first and second workpieces 11 and 12 to each other at a single spot, and the resulting welded structure will be described in the following.

First, as shown in FIG. 1, the second workpiece 12 is placed on a worktable (not shown in the drawings), and the first workpiece 11 is placed on the second workpiece 12 made of a material less readily deformable than that of the first workpiece 11 in an overlying relationship so as to form two layers at least in a region surrounding the spot at which the two workpieces are to be joined to each other.

The clamp ring 15 is placed on the upper surface of the first workpiece 11 so as to cause the lower end 26 of the inner tubular portion 22 to abut against the upper surface of the first workpiece 11, and the probe 18 is pushed into the through hole 19 of the clamp ring 15 until the lower end of the probe 18 abuts against the upper surface of the first workpiece 11. At this time, the contact surface 24 of the clamp ring 15 is spaced from the upper surface of the first workpiece 11.

Then, the rotating tool 14 is pushed downward while being rotated around the central axis thereof. As the material of the first workpiece 11 softens due to the frictional heat caused by the probe 18, and is stirred by the probe 18, the rotating tool 14 is plunged into the first workpiece 11, and the inner tubular portion 22 of the clamp ring 15 is pushed downward until the contact surface 24 of the clamp ring 15 rests upon the upper surface of the first workpiece 11.

Once the lower end of the probe 18 reaches a point slightly below the interface between the first workpiece 11 and the second workpiece 12, the probe 18 is lifted away from the first workpiece 11, and the clamp ring 15 is removed. During the entire welding process, the clamp ring 15 is prevented from rotating.

Thus, as shown in a lower part of FIG. 1 and FIG. 2, the part of the material of the first workpiece 11 as well as a small part of the material of the second workpiece 12 immediately under the probe 18 is softened and stirred by friction, and pushed upward into the central recess 25 to solidify therein and form a bonded part 28 that includes a tubular projection 27 projecting upward from the upper surface of the first workpiece 11. The bonded part 28 contains the materials of the two workpieces, and joins the two workpieces to each other. At the same time, a small amount of the material of the second workpiece 12 is pushed radially outward and upward so as to form a hooking portion 29. The hooking portion 29 projects upward and radially outward in an annular fashion around the probe 18. The hooking portion 29 is thus inclined away from the probe 18 and lies over the material of the first workpiece 11, and a tip portion of the hooking portion 29 extends into the first workpiece 11 or, more precisely, into the boundary region between the bonded part 28 and the surrounding, relatively unaffected part of the first workpiece 11 while a base end part of the hooking portion 29 is embedded in the relatively unaffected part of the second workpiece 12. This mechanically and firmly joins the two workpieces together. Thus, the first workpiece 11 and the second workpiece 12 are joined to each other by both the bonded part 28 and the hooking portion 29.

In the present embodiment, the hooking portion 29 is directed radially outward owing to the presence of the tubular projection 27 which applies a downward pressure to the material of the second workpiece 12 which is squeezed by the bottom end of the probe 18. If desired, by suitably selecting the dimensions of the probe 18 and the central recess 25, the outer peripheral surface of the hooking portion 29 can be curved so as to present a concave surface on a radially outer side thereof as seen in the vertical cross section as that in FIG. 1. In such a case, the joining force provided by the hooking portion 29 can be increased even further. Typically, the bonded part 28 is substantially annular in shape and centrally defines a cylindrical recess 20, a bottom end of the cylindrical recess 20 reaching a point beyond an interface between the first workpiece 11 and the second workpiece 12. The material for the tubular projection 27 can be obtained from the material of the workpieces that is displaced from the cylindrical recess 20 during stir welding process so that the bonded part 28 can be created without requiring introduction of any extraneous material.

If the vertical distance from the tip end of the hook portion 29 to the upper surface of the first workpiece 11 is small, the effective plate thickness of the first workpiece 11 decreases so that the peeling strength between the first workpiece 11 and the second workpiece 12 may be reduced. However, owing to the presence of the tubular projection 27, the tip end of the hooking portion 29 can be extended vertically without substantially decreasing the peel strength. Based on such a consideration, it can be concluded that the peeling strength can be maximized by selecting the vertical distance from the tip end of the hooking portion 29 and the upper surface of the tubular portion 27 to be substantially equal to the plate thickness of the first workpiece 11. For practical purposes, the vertical distance from the tip end of the hooking portion 29 and the upper surface of the tubular portion 27 is preferably 50% to 100% of the first workpiece 11. When this friction stir welding process is completed, the central recess 25 should be completely filled with the plastically displaced materials of the first workpiece 11 and the second workpiece 12. For this to happen, the various dimensions of the tool set 13 should be selected as follows:

$$(\pi D^2/4 - \pi d^2/4)H \approx \pi d^2 p/4$$

Hence, $$H \approx d^2 p/(D^2 - d^2)$$

where H is the height of the tubular portion 27 as measured from the upper surface of the first workpiece 11, p is the penetration depth of the probe 18 as measured from the upper surface of the first workpiece 11, d is the outer diameter of the probe 18, and D is the outer diameter of the central recess 25.

Preferably, the radially outer edge of the tubular projection 27 is located radially outward of the tip of the hooking portion 29. Thereby, the effective thickness of the first workpiece 11 can be ensured so that the mechanical strength of the first workpiece 11 is maintained, and the peel strength between the first and second workpieces 11 and 12 can be improved.

In this embodiment, since the lower end 26 of the inner tubular portion 22 projects beyond the contact surface 24 defined by the clamp ring 15, the lower end 26 of the inner tubular portion 22 presses the flow of the plasticized material which is squeezed out by the bottom end of the probe 18 from above during the welding process. As a result, the plasticized material of the first workpiece 11 and the second workpiece 12 is caused to be directed radially outward, and this contributes to the radially outward slant of the hooking portion 29.

Figure 4:
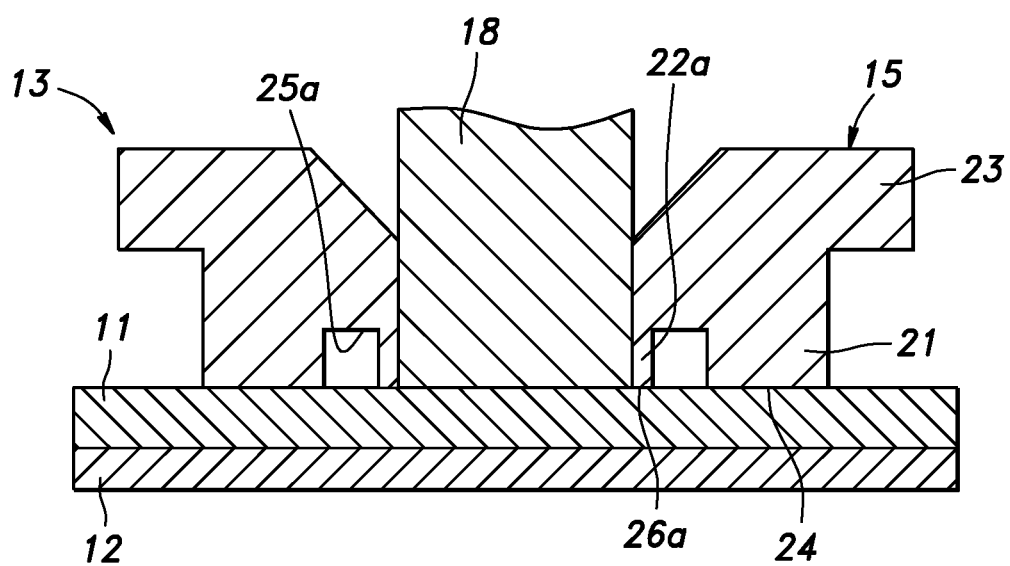
FIG. 4 is a sectional view of a welding device according to a second embodiment of the present invention.

FIG. 4 shows a tool set 13 for friction stir welding according to a second embodiment of the present invention. This embodiment is similar to the first embodiment, and the various parts of this embodiment corresponding to those of the first embodiment are denoted with like numerals without necessarily repeating the description of such parts in order to avoid redundancy. The same will apply to various embodiments that will be discussed hereinafter.

As shown in FIG. 4, the lower end of the central part of the clamp ring 15 is provided with an inner tubular portion 22a, and a central recess 25a in an annular shape is defined around the inner tubular portion 22a all in a concentric relationship similarly as in the first embodiment. However, the lower end 26a of the inner tubular portion 22a is flush with the contact surface 24 defined by the part of the clamp ring 15 surrounding the central recess 25a. Therefore, according to this embodiment, the contact surface 24 is jointly defined by the lower ends of the inner tubular portion 22a and the remaining part of the clamp ring 15. When the clamp ring 15 is placed on the first workpiece 11, the lower ends of the inner tubular portion 22 and the main body 21 of the clamp ring 15 both come into contact with the upper surface of the first workpiece 11 at the same time.

Figure 5:
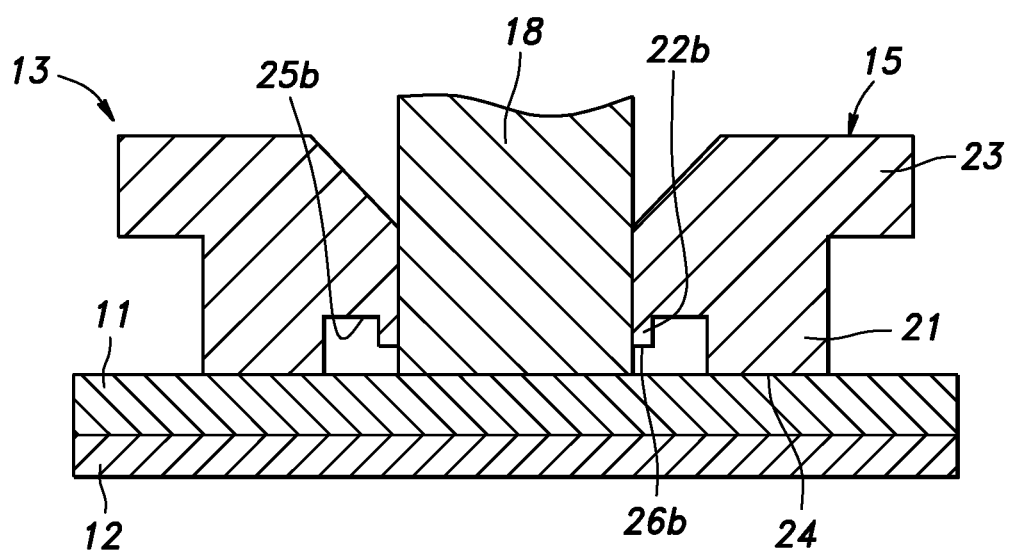
FIG. 5 is a sectional view of a welding device according to a third embodiment of the present invention.

FIG. 5 shows a tool set 13 for friction stir welding according to a third embodiment of the present invention. As shown in FIG. 5, the lower end of the central part of the clamp ring 15 is provided with an inner tubular portion 22b, and a central recess 25b is defined around the inner tubular portion 22b all in a concentric relationship similarly as in the first embodiment. However, the lower end 26b of the inner tubular portion 22a is located some distance away from the upper surface of the first workpiece 11 when the contact surface 24 of the clamp ring 15 abuts against the upper surface of the first workpiece 11, or is recessed relative to the contact surface 24 defined by the part of the clamp ring 15 surrounding the central recess 25a. Therefore, according to this embodiment, the contact surface 24 is defined solely by the lower end of the remaining part of the clamp ring 15. Thus, when the clamp ring 15 is placed on the first workpiece 11, the lower end 26b of the inner tubular portion 22b does not come into contact with the upper surface of the first workpiece 11. According to this embodiment, mechanical loading on the clamp ring 15 and the probe 18 can be minimized.

Figure 6:
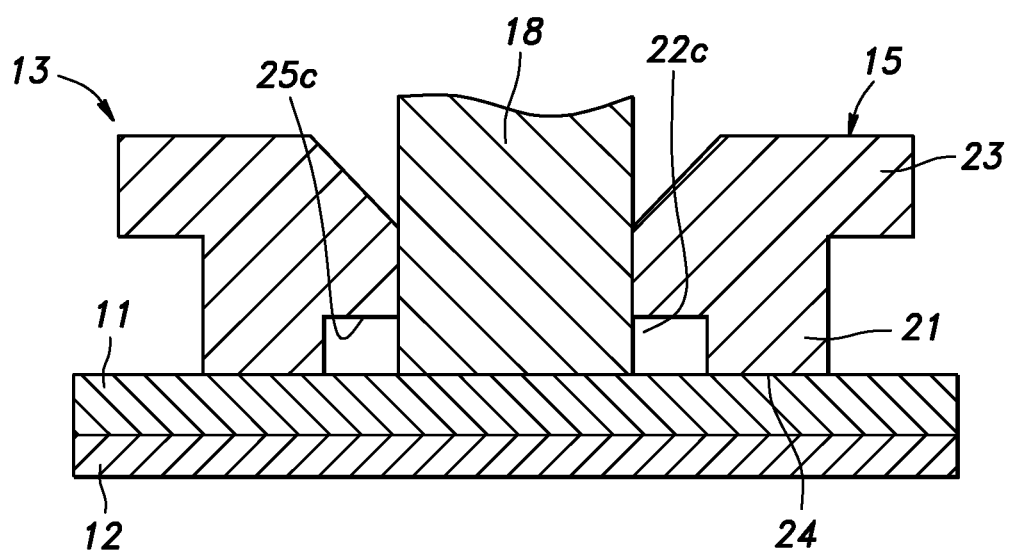
FIG. 6 is a sectional view of a welding device according to a fourth embodiment of the present invention.

FIG. 6 shows a tool set 13 for friction stir welding according to a fourth embodiment of the present invention. As shown in FIG. 6, the lower end of the central part of the clamp ring 15 is not provided with an inner tubular portion, and a circular recess 25c is defined in the central part of the lower surface of the clamp ring 15. The circular recess 25c has a substantially larger diameter than the through hole 19, and is coaxial to the through hole 19 so that the lower part of the through hole 19 essentially forms a central part of the circular recess 25c. According to this embodiment also, mechanical loading on the clamp ring 15 and the probe 18 can be minimized.

Figure 7:
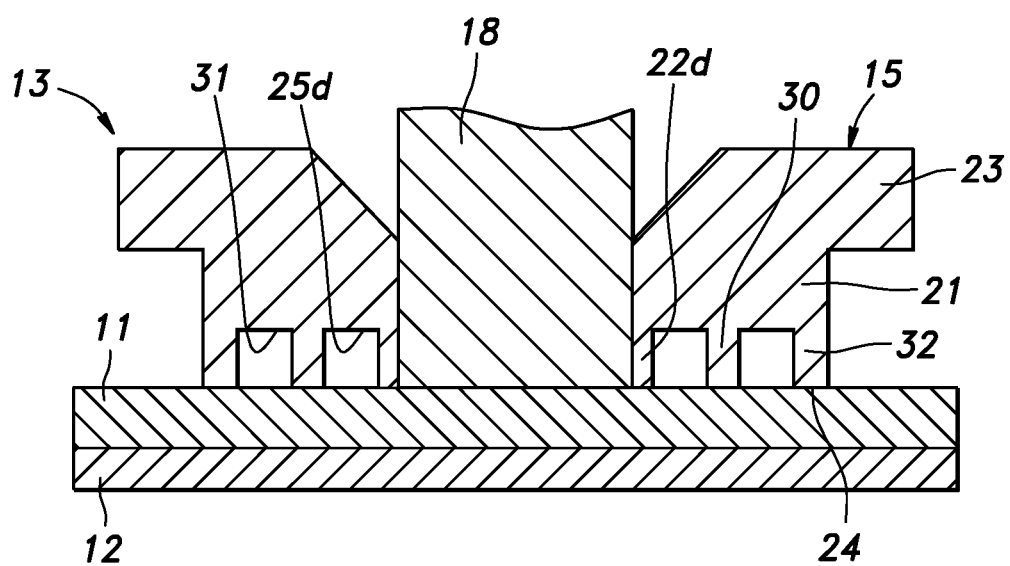
FIG. 7 is a sectional view of a welding device according to a fifth embodiment of the present invention.

FIG. 7 shows a tool set 13 for friction stir welding according to a fifth embodiment of the present invention. As shown in FIG. 7, the lower end of the clamp ring 15 is provided with an inner tubular portion 22*d* internally defining a lower part of the through hole 19, a middle tubular portion 30 which defines an inner central recess 25*d* jointly with the inner tubular portion 22*d*, and an outer tubular portion 32 which defines an outer annular recess 31 jointly with the middle tubular portion 30. The outer circumference of the outer tubular portion 32 coincides with the outer circumference of the main body 21 of the clamp ring 15 located below the radial flange 23. According to this embodiment, the contact surface 24 is jointly defined by the lower ends of the inner tubular portion 22, the middle tubular portion 30 and the outer tubular portion 32. When the clamp ring 15 is placed on the first workpiece 11, the lower ends of the inner tubular portion 22, the middle tubular portion 30, and the outer tubular portion 32 all come into contact with the upper surface of the first workpiece 11 at the same time. According to this embodiment, the outer annular recess 31 serves as an insulator for the heat generated by the friction between the probe 18 and the workpieces so that the generated heat is effectively contained in the part adjoining the lower end of the probe 18. Since the outer annular recess 31 prevents dissipation of frictional heat generated by the rotating probe 18 in radially outward direction, the welding can be performed with a minimum energy consumption.

Figure 8A:
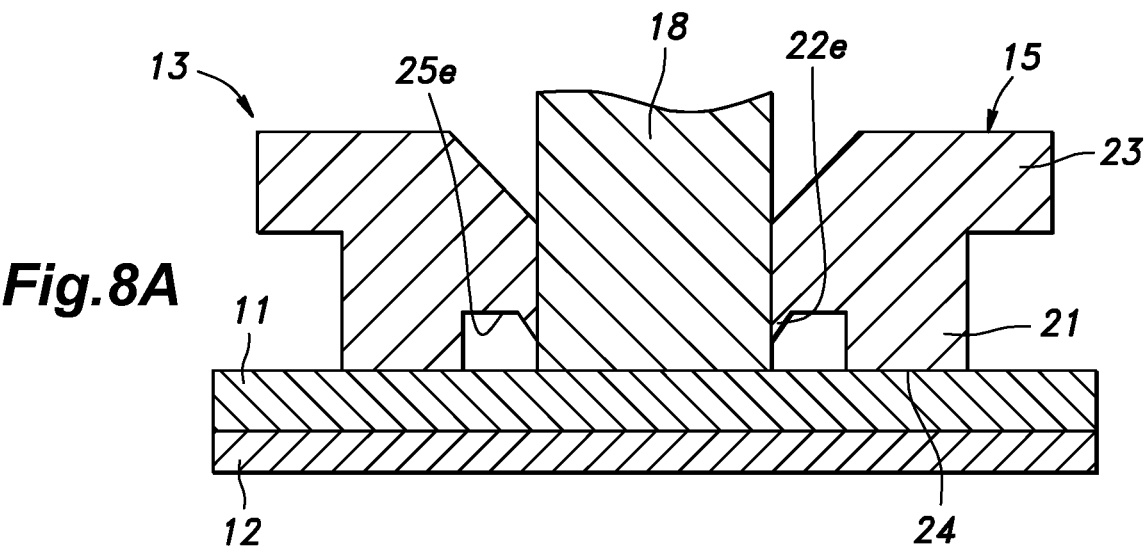
FIG. 8A is a sectional view of a welding device according to a sixth embodiment of the present invention.
Figure 8B:
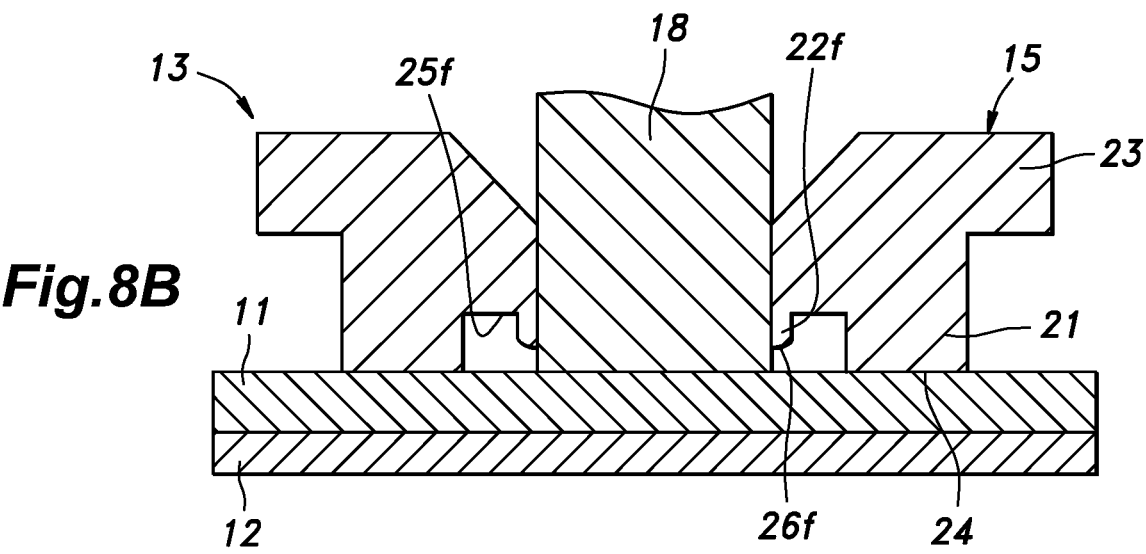
FIG. 8B is a sectional view of a welding device according to a seventh embodiment of the present invention.

FIG. 8A shows a tool set 13 for friction stir welding according to a sixth embodiment of the present invention. In this embodiment, the inner tubular portion 22*e* is formed in a conical shape which is tapered such that the outer diameter of the inner tubular portion 22*e* progressively decreases toward the lower end thereof. The lower end of the inner tubular portion 22*e* is located substantially above the contact surface 24 of the clamp ring 15. FIG. 8B shows a tool set for friction stir welding according to a seventh embodiment of the present invention. In this case, the outer periphery of the lower end of the inner tubular portion 22*f* is rounded such that the outer diameter of the inner tubular portion 22*f* progressively decreases toward the lower end thereof. The lower end of the inner tubular portion 22*f* is located substantially above the contact surface 24 of the clamp ring 15. The sixth embodiment and the seventh embodiment allow the material squeezed by the probe 18 to be smoothly introduced into the central recess 25*e*, 25*f* so that the energy consumption can be reduced, and the plastically fluid material can be shaped into a tubular portion in a smooth and flawless manner.

Figure 9A:
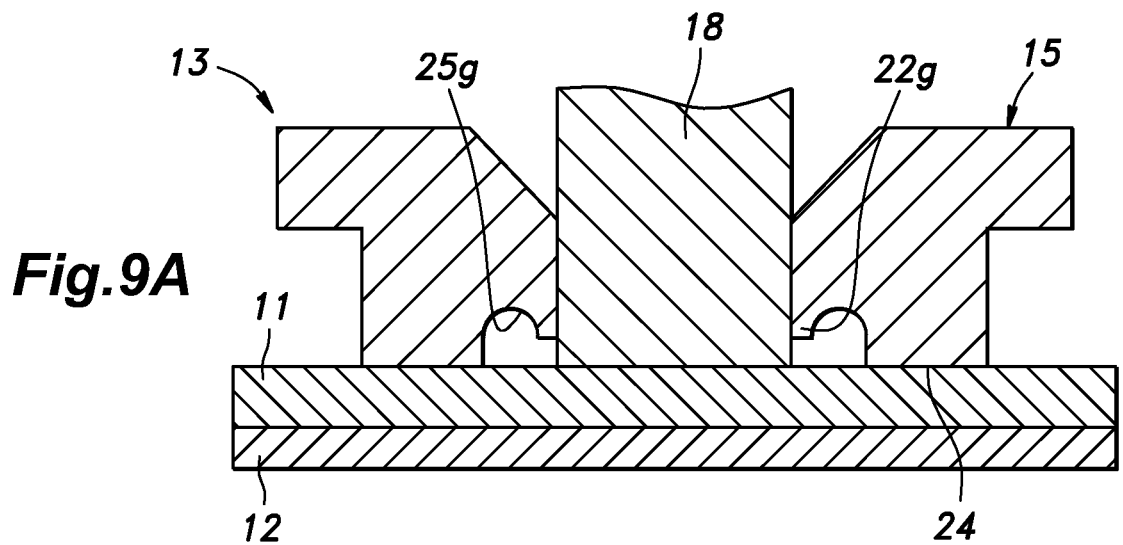
FIG. 9A is a sectional view of a welding device according to an eighth embodiment of the present invention.

FIG. 9A shows a tool set 13 for friction stir welding according to an eighth embodiment of the present invention. In this embodiment, the inner tubular portion 22*g* has a lower end which is flat and located above the contact surface 24 of the clamp ring 15, and the bottom surface of the central recess 25*g* is arcuate in shape with the concave side facing downward or toward the surface of the first workpiece 11 in cross section.

Figure 9B:
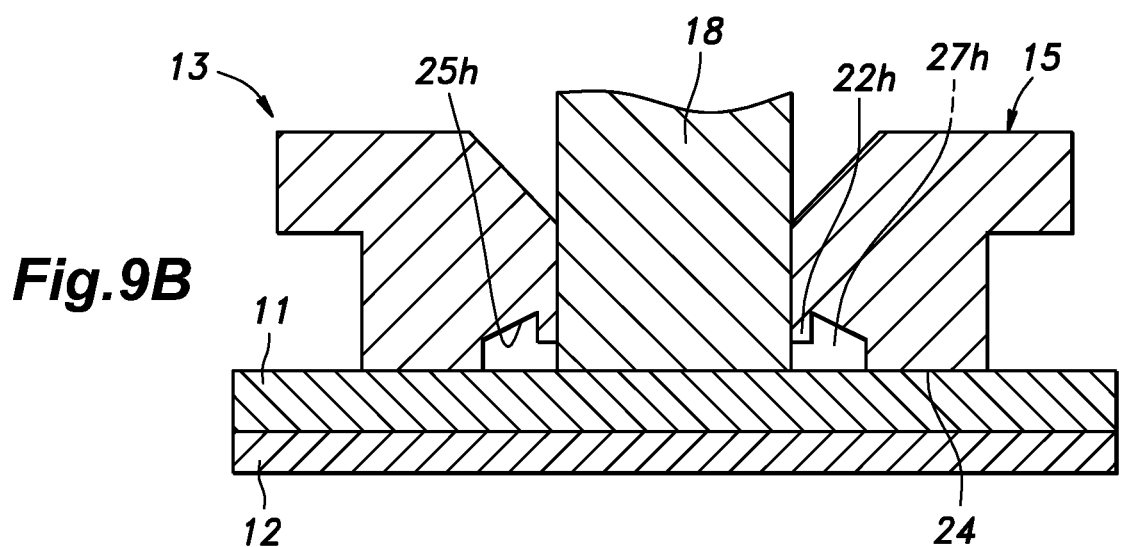
FIG. 9B is a sectional view of a welding device according to a ninth embodiment of the present invention.

FIG. 9B shows a tool set 13 for friction stir welding according to a ninth embodiment of the present invention. In this embodiment, the inner tubular portion 22*h* has a lower end which is flat and located above the contact surface 24 of the clamp ring 15, and the bottom surface of the central recess 25*h* is slanted so as to come closer to the surface of the first workpiece 11 as one moves away from the central axis of the clamp ring 15 so as to present a conical surface.

Figure 9C:
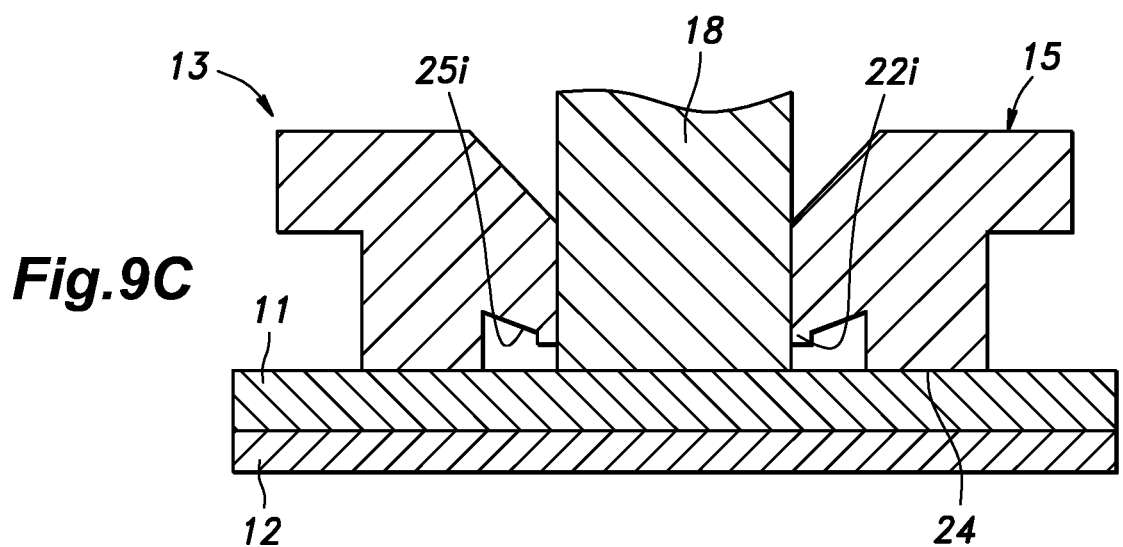
FIG. 9C is a sectional view of a welding device according to a tenth embodiment of the present invention.

FIG. 9C shows a tool set 13 for friction stir welding according to a tenth embodiment of the present invention. In this embodiment, the inner tubular portion 22*i* has a lower end which is flat and located above the contact surface 24 of the clamp ring 15, and the bottom surface of the central recess 25*i* is slanted so as to come closer to the surface of the first workpiece 11 as one moves toward the central axis of the clamp ring 15 so as to present an inverted conical surface. Again, these shapes for the bottom surface of the central recess 25 are beneficial in suitably guiding the plastically fluid part of the materials of the first and second workpieces.

Figure 10:
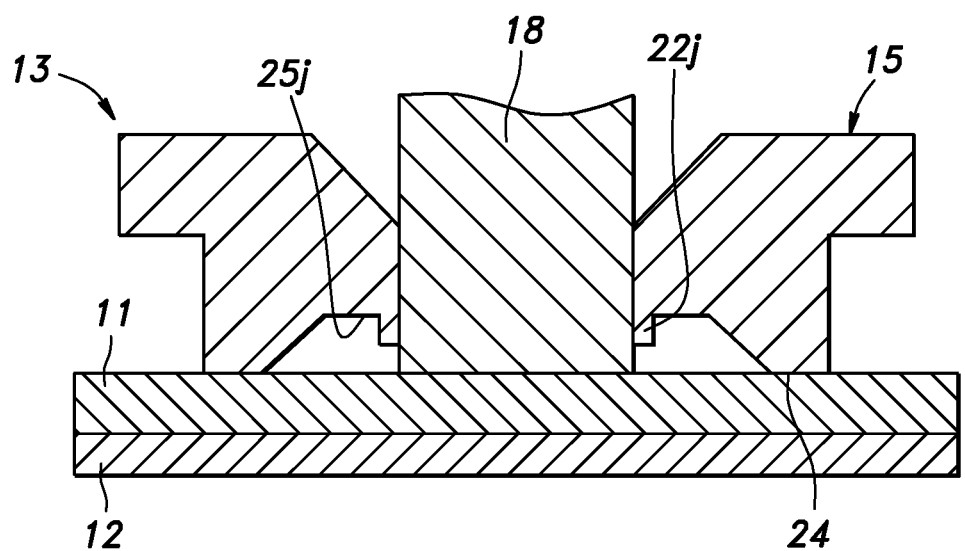
FIG. 10 is a sectional view of a welding device according to an eleventh embodiment of the present invention.
Figure 11A:
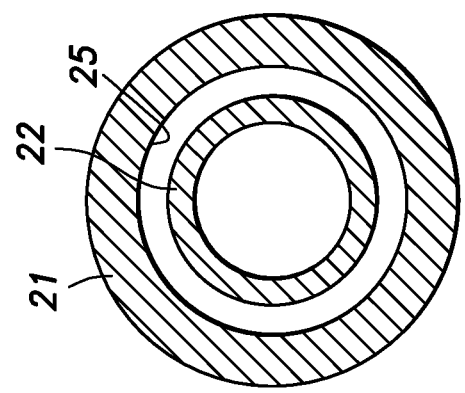
FIG. 11A is a sectional view of a probe and a clamp ring according to one suitable embodiment of the present invention.
Figure 11B:
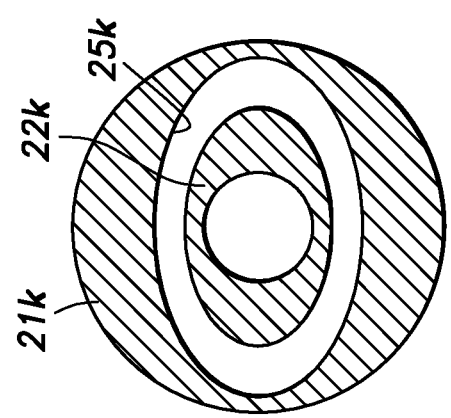
FIG. 11B is a sectional view of a probe and a clamp ring according to another embodiment of the present invention.
Figure 11C:
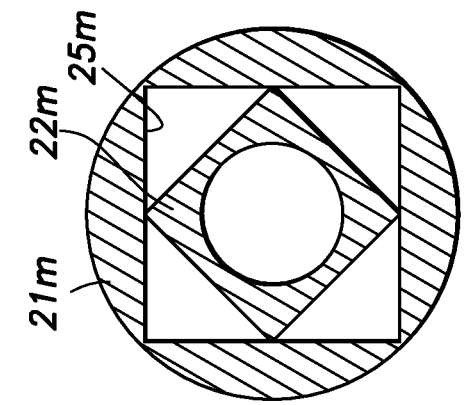
FIG. 11C is a sectional view of a probe and a clamp ring according to yet another embodiment of the present invention.

FIG. 10 shows yet another different configuration of the annular recess according to an eleventh embodiment of the present invention. In this case, the inner tubular portion 22*j* has a lower end which is flat and located above the contact surface 24 of the clamp ring 15, and the radially inner part of the central recess 25*j* has a flat bottom surface, but the radially outer part of the central recess 25*j* or the radially outer wall thereof has a conical surface which comes progressively closer to the upper surface of the first workpiece 11 as one moves radially outward from the axis. The presence of inclined or curved surfaces in the central recess 25 increases the bonding strength between the tubular projection 27 and the remaining part of the bonded part 28, and promotes a smooth displacement of plastically fluid material into the central recess 25 so that the bonding strength and the bonding reliability can be improved, The inner tubular portions 22 in the foregoing embodiments were circular in shape, and so was the central recess 25 as shown in FIG. 11A. However, the cross-sectional shape of the inner tubular portion 22 and the central recess 25 may have different shapes. In the example shown in FIG. 11B, the outer profile of the inner tubular portion 22*k* is elliptic, and thus has a wall thickness that varies along the circumference thereof. In this embodiment, the outer periphery of the central recess 25*k* conforms to the outer circumferential surface of the inner tubular portion 22 so that the central recess 25*k* has a substantially constant width. However, the width of the annular recess may also vary along the circumference thereof by suitably selecting the shape of the outer periphery of the central recess 25.

FIG. 1C shows an embodiment where the outer profile of the inner tubular portion 22*m* is rectangular or square, and thus has a wall thickness that varies along the circumference thereof. The outer periphery of the central recess 25*m* is rectangular in shape, and the corners of the inner tubular portion 22*m* is connected to the mid points of the respective sides of the main body 21*m* of the clamp ring 15 defining the outer periphery of the central recess 25*m*.

Figure 11D:
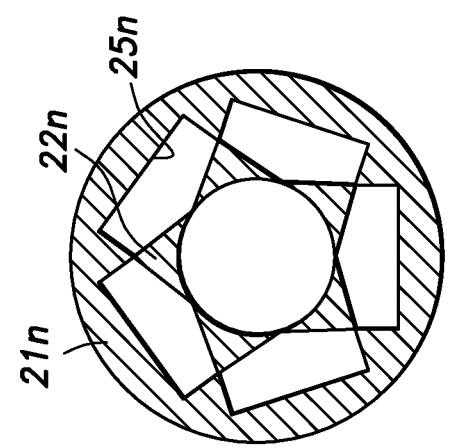
FIG. 11D is a sectional view of a probe and a clamp ring according to still another embodiments of the present invention.

FIG. 11D shows an embodiment where the outer profile of the inner tubular portions 22*n* is star-shaped (five-point star in the illustrated example). The wall thickness of the inner tubular portions 22*n* thus varies significantly along the circumference thereof, and can become extremely thin at the bases of the projections forming the star-shape. The outer profile of the central recess 25*n* is generally pentagonal, but the corners thereof are each provided with an inwardly directed triangular projection whose tip joins with the corresponding tip of the star-shaped inner tubular portion 22*n*.

Figure 11E:
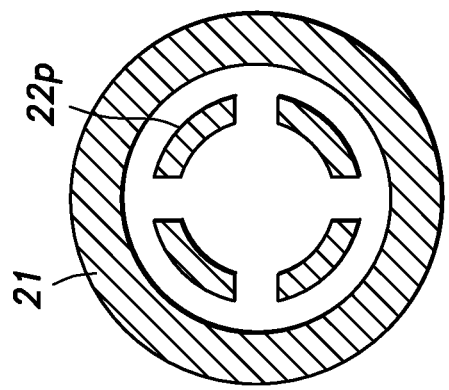
FIG. 11E is a sectional view of a probe and a clamp ring according to a further embodiment of the present invention.

The wall of the inner tubular portions 22 may not be continuous along the circumference thereof, but may be broken at points. FIG. 11E shows a case where the inner tubular portion 22*p* is annular in shape, but has notches in the free (lower) end thereof arranged along the circumferential direction thereof (castellated free end). In other words, the lower end of the inner tubular portion 22*p* is separated into four parts by radial slots along the circumference thereof. These four parts may be equal to one another in shape, but may also be different. Providing breaks in the inner tubular portion 22*p* is beneficial in suitably guiding the flow of the plasticized material. Also, these irregular shapes of the inner tubular portion 22 allow the hooking portion 29 to be shaped as desired for optimum results depending on the material properties and geometric conditions of the parts to be joined together.

Figure 12:
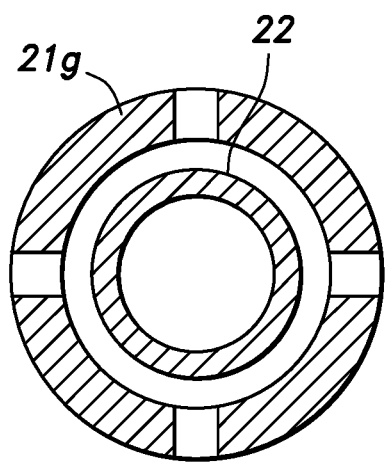
FIG. 12 is a sectional view of a probe and a clamp ring according to yet another embodiment of the present invention.
Figure 13:
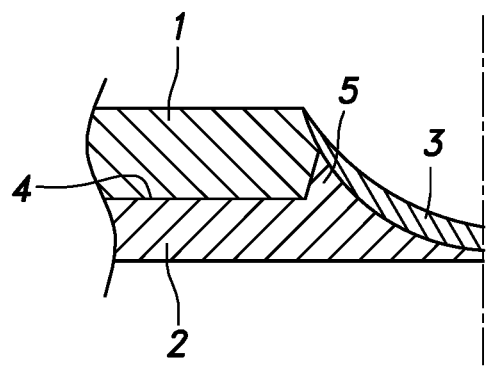
FIG. 13 is a sectional view of a welded structure formed by a conventional friction stir welding device.

FIG. 12 shows an embodiment where the inner tubular portion 22 is circular or annular in shape and continuous along the circumference thereof, but the main body 21 of the clamp ring 15 is separated into four segments by radial grooves formed in the contact surface 24. By separating the contact surface 24 into a plurality of segments, the contact pressure per unit contact area can be increased, and the dissipation of friction heat via the main body 21 of the clamp ring 15 can be reduced. As a result, the quality of friction stir welding can be improved.

The present invention has been described in terms of specific embodiments, but the present invention is not limited by the illustrated embodiments, and can be altered and substituted in various ways without departing from the spirit of the present invention. For instance, various features of different parts of the tool set can be combined in an interchangeable manner, and such combinations should be considered as being part of the scope of the present invention even when such combinations are not explicitly illustrated or otherwise disclosed.

The invention claimed is:

1. A stir welding device for joining a plurality of workpieces in a mutually overlying relationship, comprising:
   a probe having a cylindrical shape and rotatable around a central axis thereof,
   a clamp ring having a through hole for receiving the probe therein, and a contact surface configured to abut against a surface of one of the workpieces; and
   a drive unit for rotationally driving the probe and plunging the probe into the workpieces,
   wherein the clamp ring is provided with a central recess in a part of the contact surface thereof located around the through hole, and the central recess is configured to be able to receive a part of material of the plurality of workpieces which is pushed by the probe,
   wherein the probe is independently rotatable relative to the clamp ring,
   wherein the clamp ring is provided with an inner tubular portion projecting axially from a bottom end of the central recess,
   wherein the inner tubular portion has notches in a free end thereof arranged along the circumferential direction thereof.

2. The stir welding device according to claim 1, wherein the inner tubular portion extends continuously along a circumferential direction thereof, and has a constant radial width.

3. The stir welding device according to claim 1, wherein the central recess has a flat bottom end.

4. A stir welding device for joining a plurality of workpieces in a mutually overlying relationship, comprising:
   a probe having a cylindrical shape and rotatable around a central axis thereof;
   a clamp ring having a through hole for receiving the probe therein, and a contact surface configured to abut against a surface of one of the workpieces; and
   a drive unit for rotationally driving the probe and plunging the probe into the workpieces,
   wherein the clamp ring is provided with a central recess in a part of the contact surface thereof located around the through hole,
   wherein the clamp ring is provided with an inner tubular portion projecting axially from a bottom end of the central recess,
   wherein the inner tubular portion has a free end that projects beyond the contact surface.

* * * * *